US012110741B2

(12) United States Patent
Lee et al.

(10) Patent No.: US 12,110,741 B2
(45) Date of Patent: Oct. 8, 2024

(54) MECHANICAL MULTIPLE TORQUE DAMPING DEVICE FOR A HORIZONTAL SPINDLE

(71) Applicant: SYNCPROTO CO., LTD., New Taipei (TW)

(72) Inventors: Cheng-Hung Lee, New Taipei (TW); Lung-Yi Chiang, New Taipei (TW)

(73) Assignee: SYNCPROTO CO., LTD., New Taipei (TW)

( * ) Notice: Subject to any disclaimer, the term of this patent is extended or adjusted under 35 U.S.C. 154(b) by 373 days.

(21) Appl. No.: 17/840,312

(22) Filed: Jun. 14, 2022

(65) Prior Publication Data

US 2023/0025616 A1 Jan. 26, 2023

(30) Foreign Application Priority Data

Jul. 20, 2021 (TW) ................................ 110126614

(51) Int. Cl.
*E06B 9/88* (2006.01)
*E06B 9/42* (2006.01)
*E06B 9/80* (2006.01)

(52) U.S. Cl.
CPC .................. *E06B 9/88* (2013.01); *E06B 9/42* (2013.01); *E06B 2009/807* (2013.01)

(58) Field of Classification Search
CPC ........ E06B 9/80; E06B 9/50; E06B 2009/807; E06B 9/88; E06B 9/62; E06B 9/42
See application file for complete search history.

(56) References Cited

U.S. PATENT DOCUMENTS

2011/0005694 A1* 1/2011 Ng ............................ E06B 9/44 160/311
2011/0265963 A1* 11/2011 Drew ...................... E06B 9/262 160/340
2014/0216666 A1* 8/2014 Smith ...................... E06B 9/90 160/84.04
2014/0262069 A1* 9/2014 Drew ........................ E06B 9/34 160/405
2019/0352963 A1* 11/2019 Jang .......................... E06B 9/40
2020/0109600 A1* 4/2020 Jang .......................... E06B 9/42
2020/0123853 A1* 4/2020 Chen ......................... E06B 9/90

* cited by examiner

*Primary Examiner* — Abe Massad
*Assistant Examiner* — Matthew R. Shepherd
(74) *Attorney, Agent, or Firm* — HSML P.C.

(57) ABSTRACT

A mechanical multiple torque damping device includes a support module, a spindle coupling sleeve and a damping cylinder. The support module includes a mounting seat, a tubular support axle extending from the mounting seat, a friction ring sleeved on the support axle, and a screw shaft extending through the support axle. The spindle coupling sleeve is rotatably sleeved on the support axle to support a horizontal spindle. The damping cylinder is axially displaceable along the screw shaft relative to the friction ring during rotation with the horizontal spindle. A cylinder body of the cylinder has inner frictional surface sections in frictional contact with the friction ring to generate multiple frictional torques to the horizontal spindle.

11 Claims, 12 Drawing Sheets

MECHANICAL MULTIPLE TORQUE DAMPING DEVICE FOR A HORIZONTAL SPINDLE

CROSS-REFERENCE TO RELATED APPLICATION

This application claims priority of Taiwanese Patent Application No. 110126614, filed on Jul. 20, 2021.

FIELD

The disclosure relates to a mechanical damping device, and more particularly to a mechanical multiple torque damping device for reducing a rotational speed of a horizontal spindle.

BACKGROUND

A roller shade that can be lowered freely generally has a pull cord for a user to control the lowering speed of the roller shade. Rapid lowering of the roller shade may occur since the user does not exert a resisting force on the pull cord to regulate the lowering of the roller shade. Such rapid lowering of the roller shade is undesirable as it will result in great vibration and noise. To prevent rapid lowering of the roller shade, a mechanical damping device is disposed on a horizontal spindle of a roller shade to reduce the rotational speed of the spindle. The damping device generally has a fixed resisting force that is applied to the spindle so that the resisting force may be too large for the shade to be lowered initially. Thus, it is desired to vary the resisting force during the lowering process so as to bring the shade down smoothly and steadily.

An electronically controlling damping system is proposed and utilizes a position monitoring or time controlling means and digital output to vary and regulate the damping force of a roller shade so as to meet the requirement of multiple different damping forces during the shade lowering process. However, such electronically controlled damping system is expensive and bulky, and is inconvenient to install. It is not suitable for using in some window shades, such as roller blinds that are small in size and require easy installation.

SUMMARY

Therefore, an object of the disclosure is to provide a mechanical multiple torque damping device that can generate multiple frictional torques during a rotation stroke to alleviate at least one of the drawbacks of the prior art.

According to the disclosure, the mechanical multiple torque damping device is connectable with an end of a horizontal spindle, and includes a support module, a spindle coupling sleeve and a damping cylinder. The support module includes a mounting seat, a tubular support axle, an elastomer friction ring and a screw shaft. The mounting seat has a base wall to permit an axis of the horizontal spindle to be normal to the base wall. The base wall has inner and outer wall surfaces opposite to each other. The tubular support axle is securely connected with the base wall and extends from the inner wall surface to have a terminal end. The friction ring is securely sleeved on the terminal end of the support axle. The screw shaft coaxially extends through the tubular support axle and has a threaded portion extending outwardly of the terminal end of the tubular support axle. The spindle coupling sleeve is connectable and rotatable with the horizontal spindle. The spindle coupling sleeve is rotatably and coaxially sleeved on the tubular support axle and adjacent to the base wall. The damping cylinder is coaxial with the tubular support axle and the spindle coupling sleeve, and is rotatable with the horizontal spindle. The damping cylinder has a cylinder body which extends axially to terminate at opened and closed end portions. The opened end portion is disposed proximate to the friction ring. The closed end portion has a screw hole which is threadedly engaged with the threaded portion of the screw shaft such that the damping cylinder is axially displaceable along the screw shaft relative to the friction ring during rotation with the horizontal spindle. The cylinder body has a plurality of inner frictional surface sections which are formed axially and which have different inner diameters such that the inner frictional surface sections are in frictional contact with the friction ring during axial displacement of the damping cylinder to generate multiple frictional torques.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
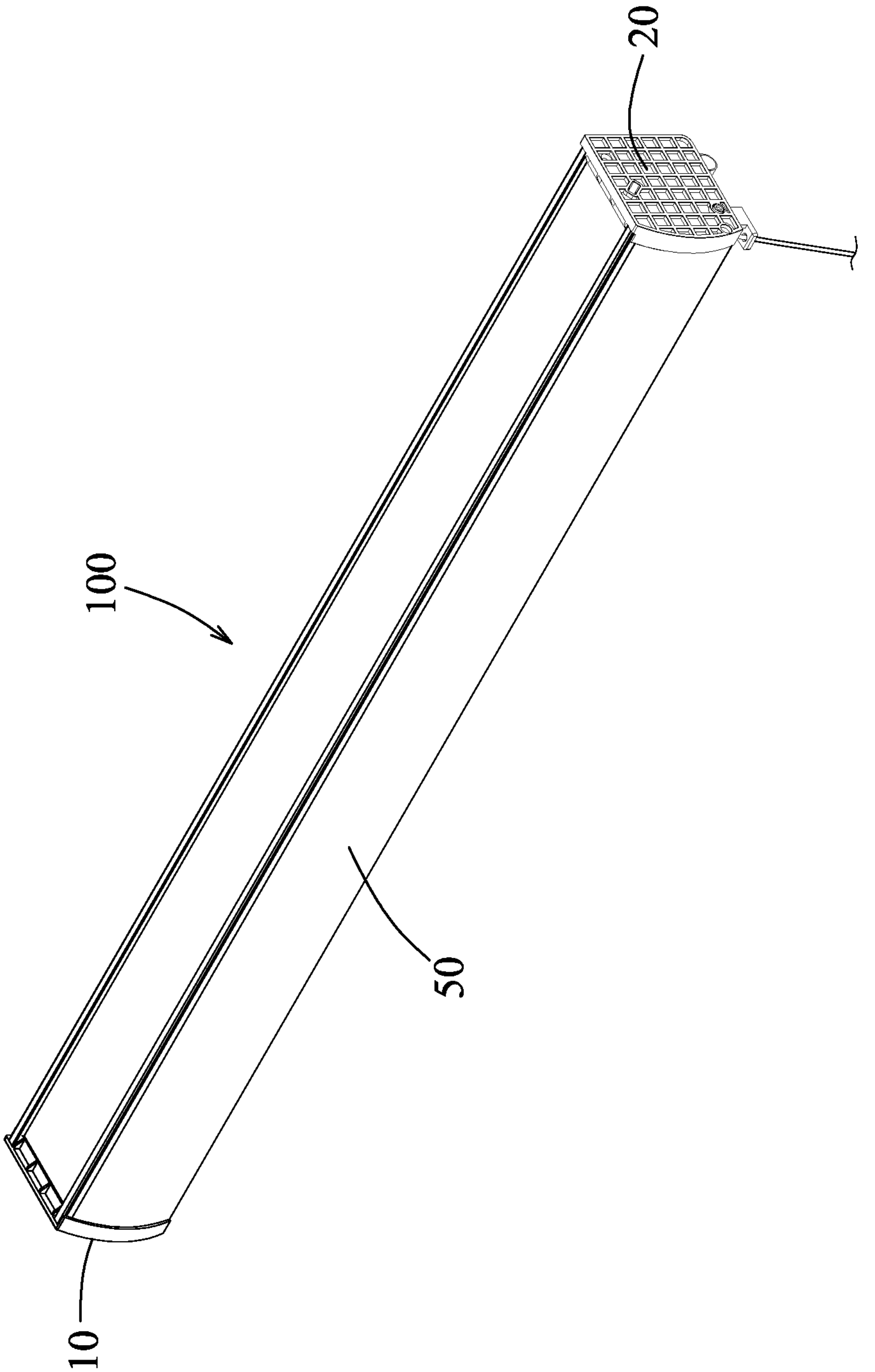
FIG. 1 is a schematic perspective view illustrating an embodiment of a mechanical multiple torque damping device according to the disclosure mounted on a roller shade.
Figure 2:
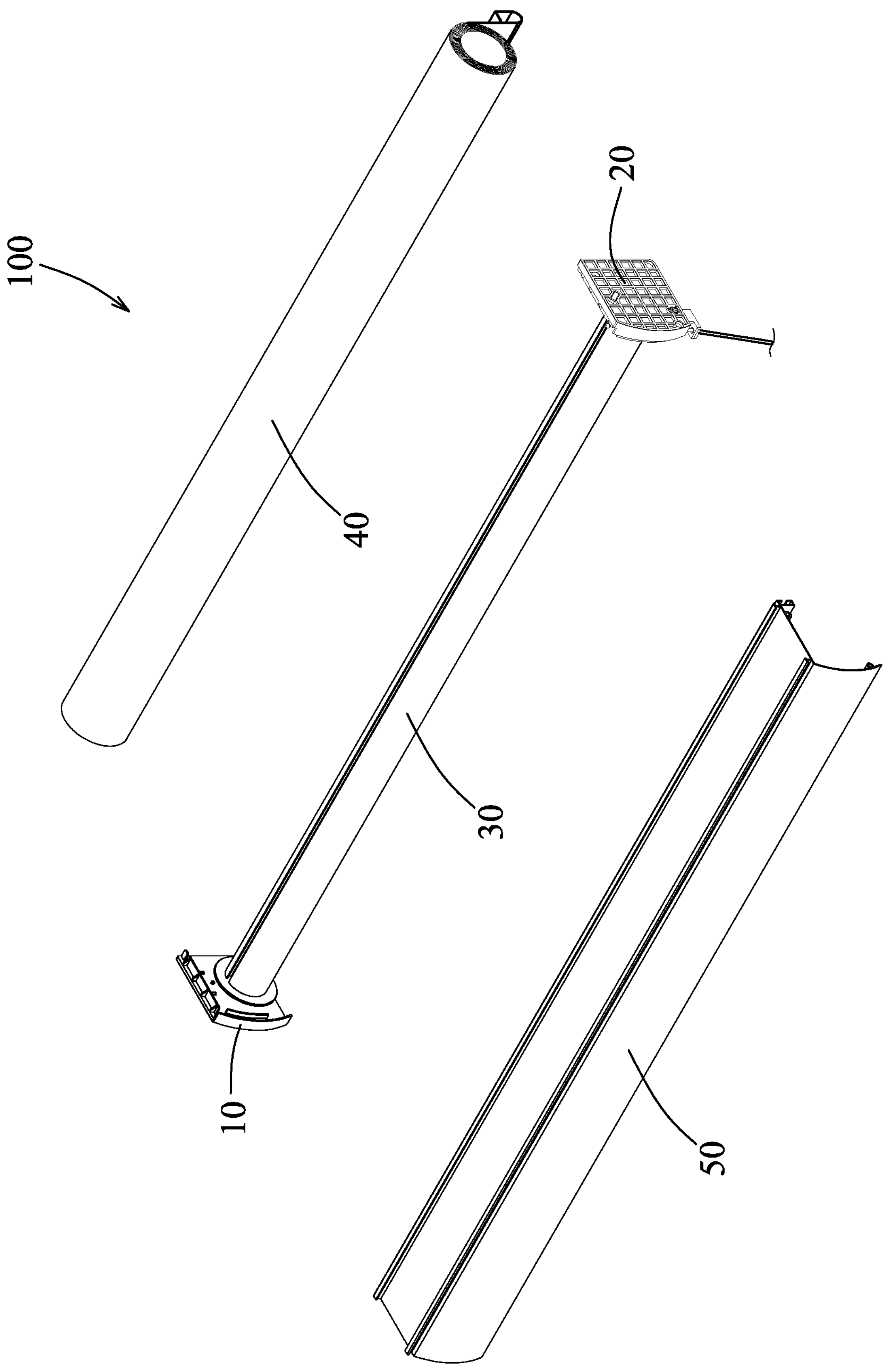
FIG. 2 is an exploded perspective view of the roller shade.

Referring to FIGS. 1 and 2, an embodiment of a mechanical multiple torque damping device 10 according to the disclosure is utilized on a roller shade 100. The roller shade 100 includes a lifting control device 20, a horizontal spindle 30 having two ends which are respectively connected with the damping device 10 and the lifting control device 20, a shade body 40 rolled on the horizontal spindle 30, and a rail cover 50 connected with the damping device 10 and the lifting control device 20 and covering the shade body 40. The lifting control device 20 is operated to rotate the horizontal spindle 30 so as to control rolling up and down of the shade body 40. The damping device 10 is employed to provide a damping force for the horizontal spindle 30 during a free lowering process of the shade body 40 so as to lower the shade body 40 steadily and slowly.

Figure 3:
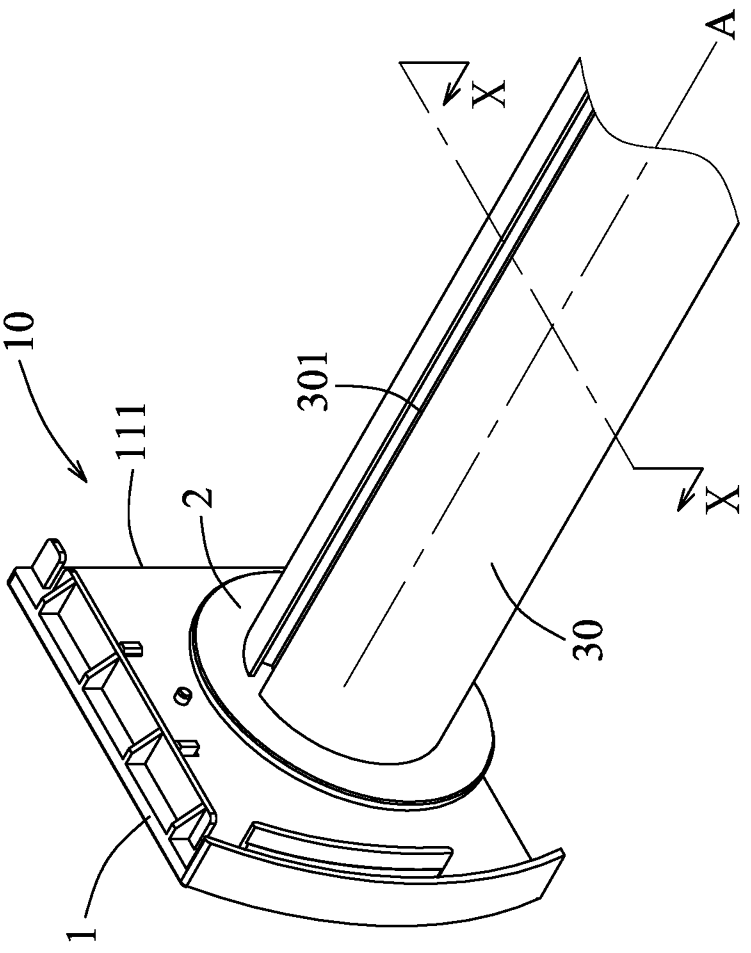
FIG. 3 is a fragmentary perspective view illustrating the embodiment connected with a horizontal spindle.
Figure 4:
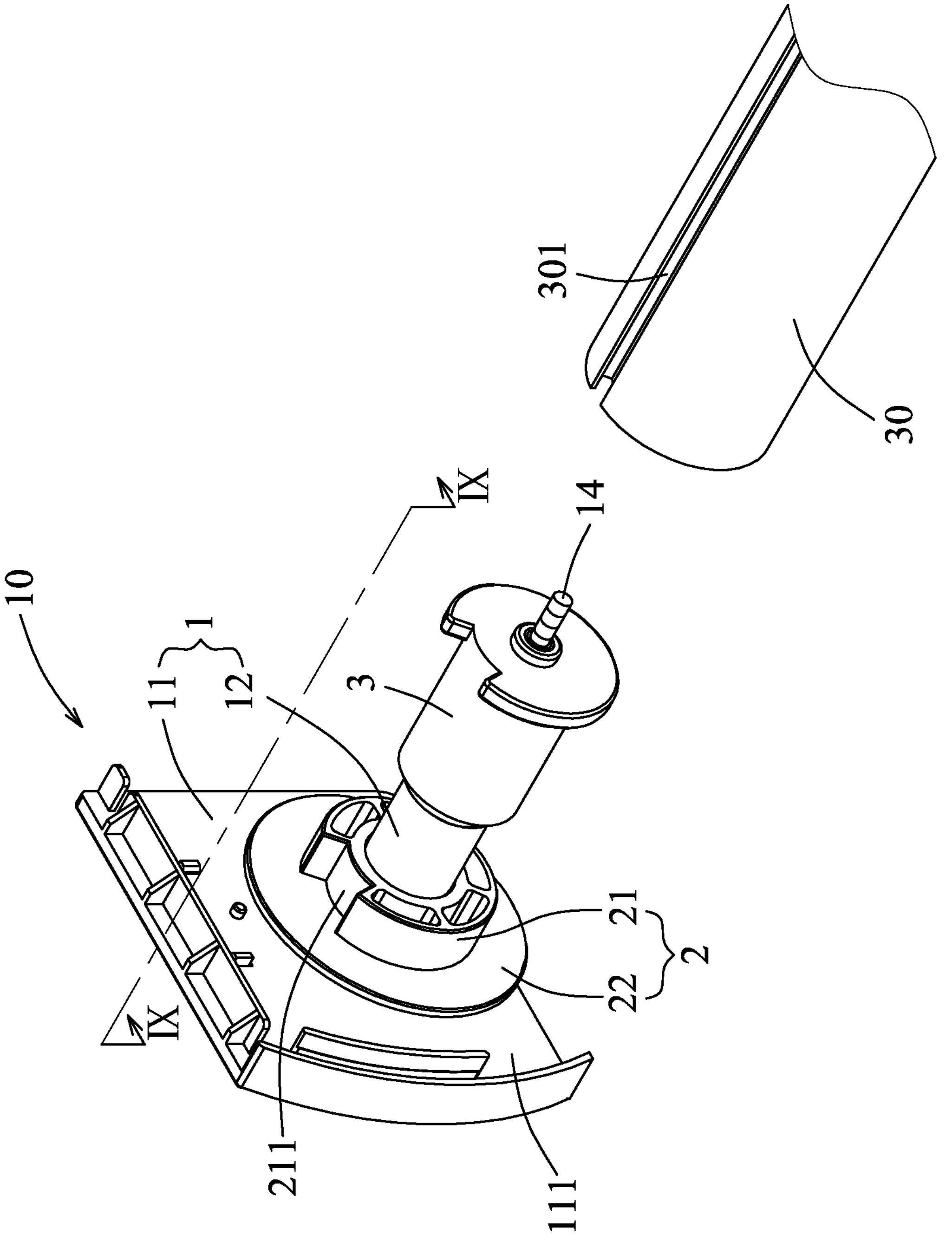
FIG. 4 is a fragmentary, exploded perspective view illustrating the embodiment and the horizontal spindle.
Figure 5:
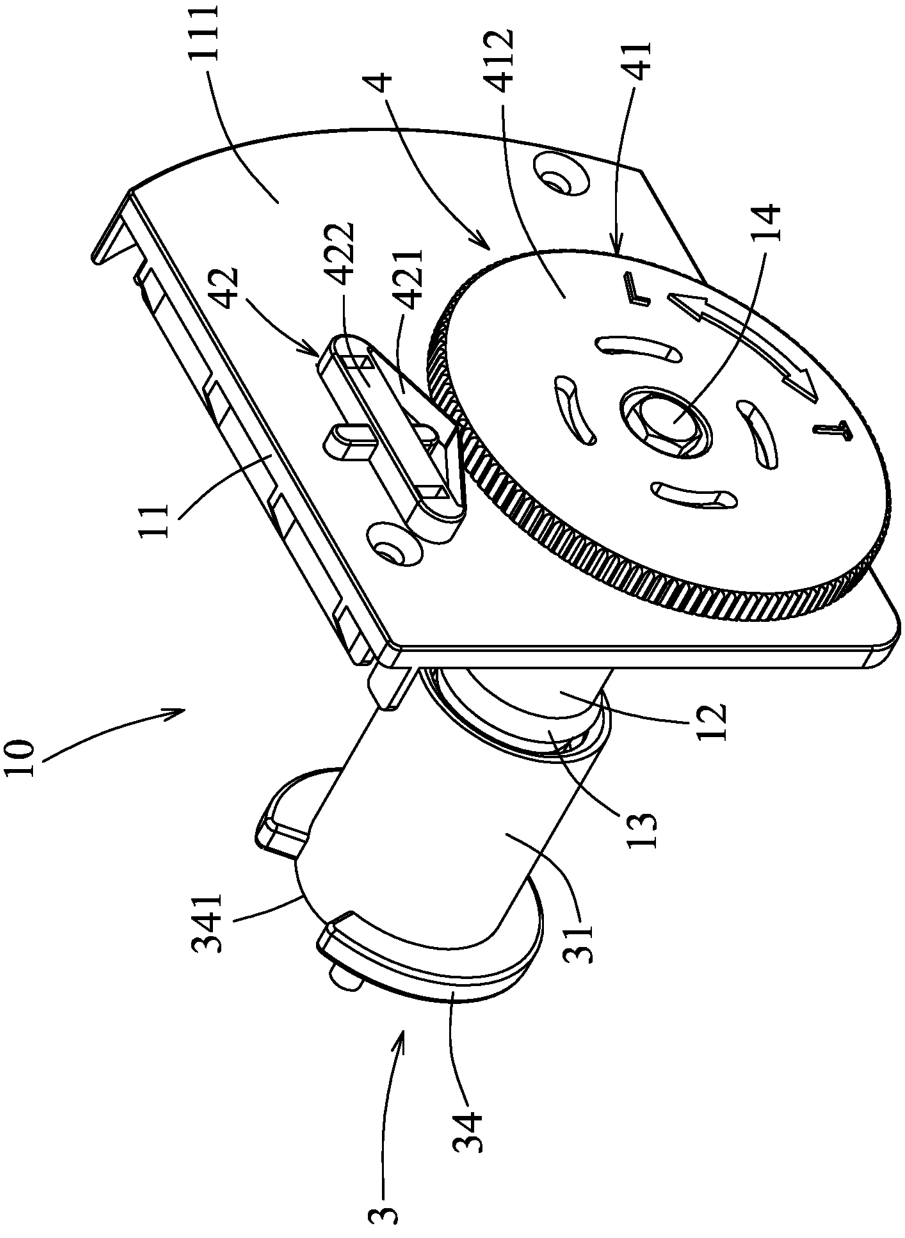
FIG. 5 is a perspective view of the embodiment.
Figure 6:
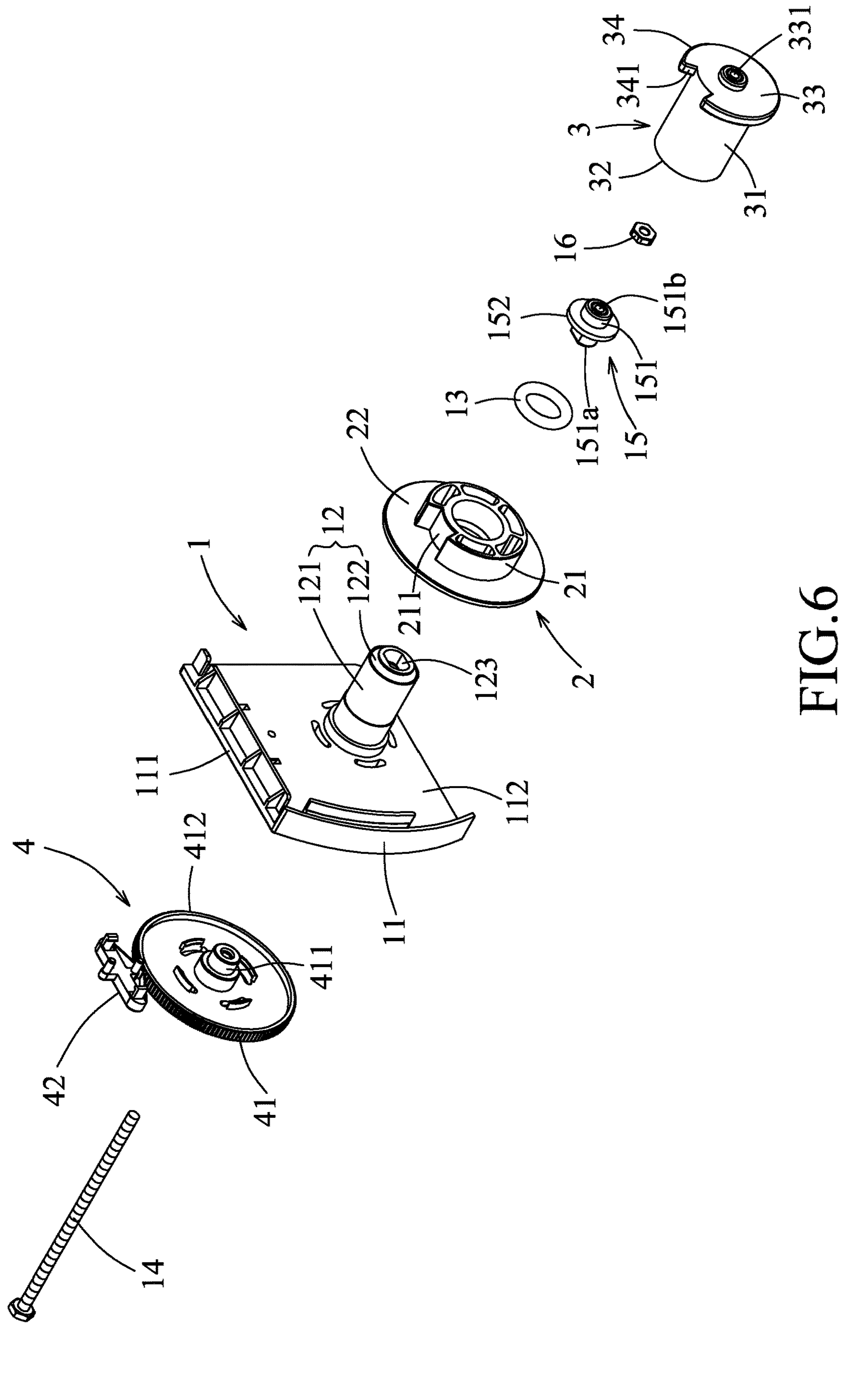
FIG. 6 is an exploded perspective view of the embodiment.
Figure 7:
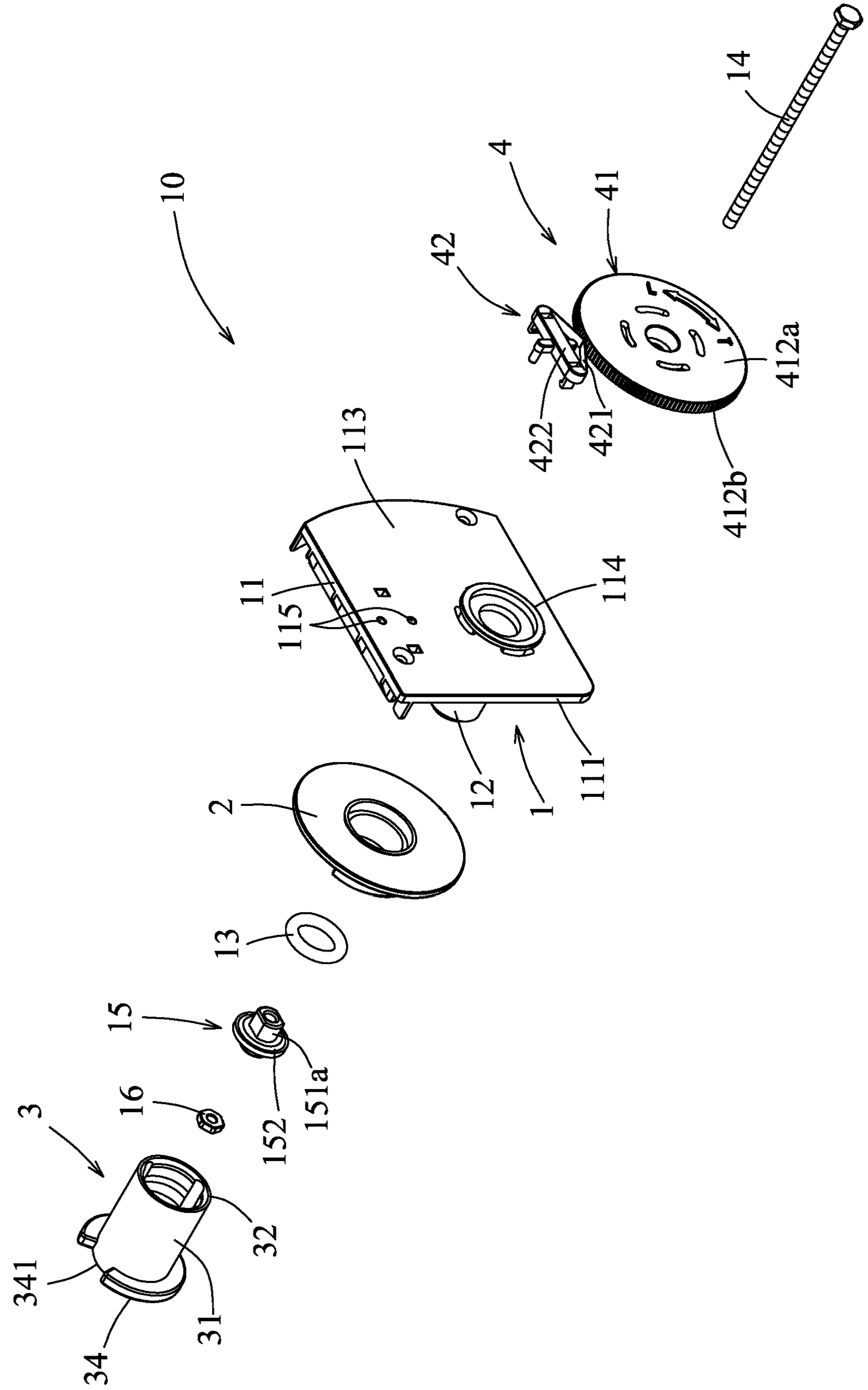
FIG. 7 is an exploded perspective view of the embodiment, taken from another angle.

With reference to FIGS. 3 to 5, the mechanical multiple torque damping device 10 includes a support module 1, a spindle coupling sleeve 2, a damping cylinder 3 and a tightness regulating module 4.

With reference to FIGS. 6 to 9, the support module 1 includes a mounting seat 11, a tubular support axle 12, an elastomer friction ring 13, a screw shaft 14, a tubular tightening member 15 and a fastener 16. The mounting seat 11 is connectable with the rail cover 50 (see FIG. 2), and has a base wall 111 to permit an axis (A) of the horizontal spindle 30 to be normal to the base wall 111 (see FIG. 3). The base wall 111 has inner and outer wall surfaces 112, 113 opposite to each other. The tubular support axle 12 is securely connected with the base wall 111 and extends axially from the inner wall surface 112 to have a terminal end. In this embodiment, the tubular support axle 12 has a main tubular portion 121 which extends axially from the base wall 111, and a narrow tubular portion 122 which extends axially from the main tubular portion 121 and which has a gradually decreasing outer diameter to serve as the terminal end. The narrow tubular portion 122 has a non-circular anti-rotation hole 123 formed in a center thereof. The friction ring 13 is an elastomer and securely sleeved on the narrow tubular portion 122. The screw shaft 14 coaxially extends through the tubular support axle 12 and has a threaded portion that extends outwardly of the terminal end of the tubular support axle 12. The tubular tightening member 15 has an axial portion 151 and a radial portion 152 which extends radially from the axial portion 151. The axial portion 151 has a centering section (151*a*) which is disposed at a side of the radial portion 152 and non-rotatably fitted to the anti-rotation hole 123, and an internally threaded section (151*b*) which is threadedly engaged with the threaded portion of the screw shaft 14 such that operation of the screw shaft results in axial displacement of the tubular tightening member 15 relative to the tubular support axle 12. The radial portion 152 cooperates with the narrow tubular portion 122 to tighten the friction ring 13. Thus, the tightness of the friction ring 13 can be regulated by the axial displacement of the tubular tightening member 15. An operation of the screw shaft 14 for the axial displacement of the tubular tightening member 15 will be described in detail as follows. The fastener 16 is threadedly engaged with the screw shaft and abuts against the axial portion 151 of the tubular tightening member 15 at an end opposite to the centering section (151*a*) so as to firmly fasten the screw shaft 14 to the tubular tightening member 15. In this embodiment, the fastener 16 is a screw nut.

Figure 10:
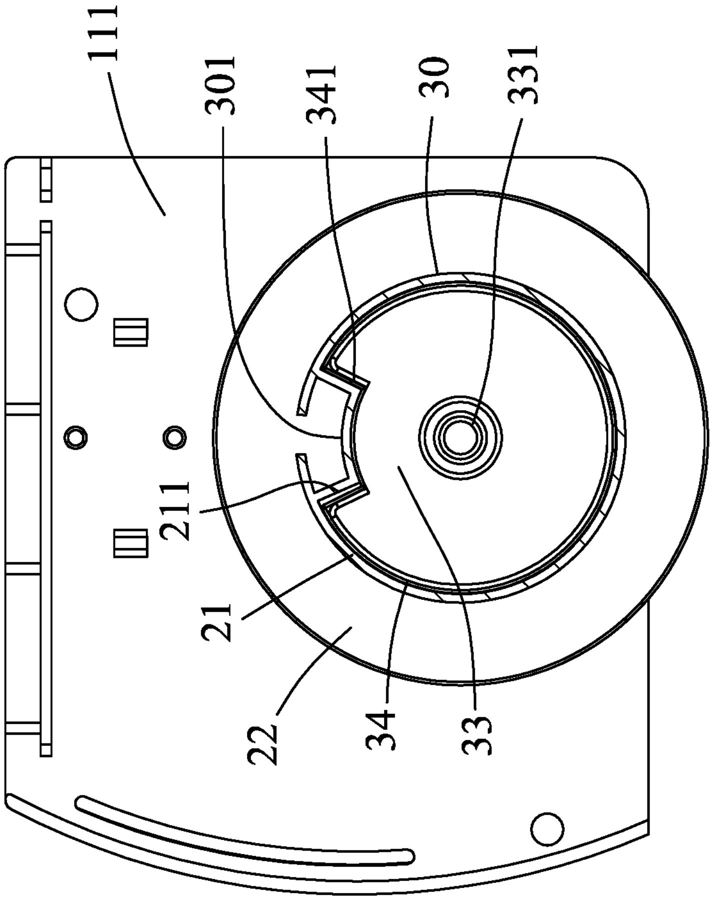
FIG. 10 is sectional view taken along line X-X of FIG. 3.
Figure 11:
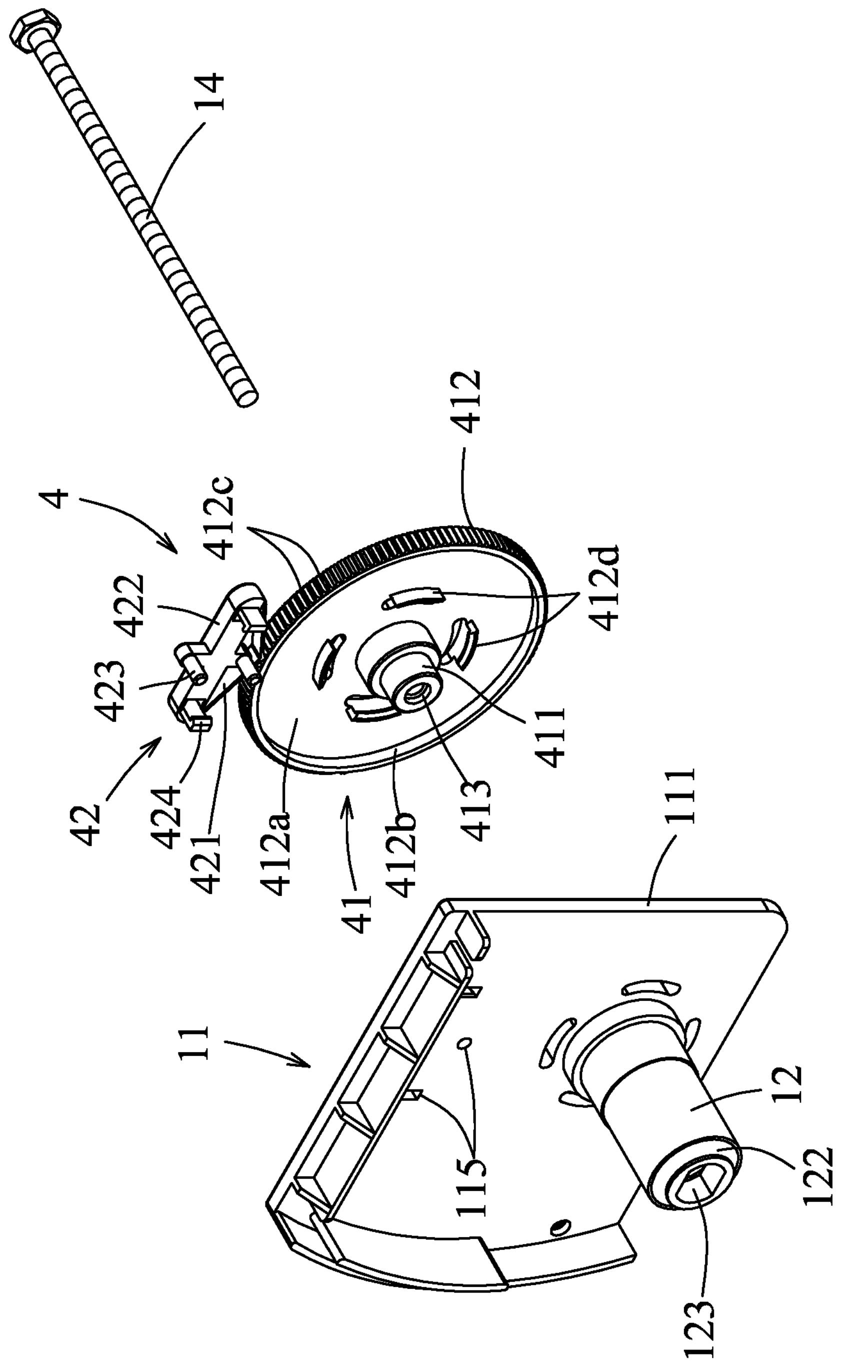
FIG. 11 is a partly exploded perspective view of the embodiment.

With reference to FIGS. 3, 4 and 10, the spindle coupling sleeve 2 is rotatably and coaxially sleeved on the tubular support axle 12 and adjacent to the base wall 111 to be connected and rotatable with the horizontal spindle 30. The spindle coupling sleeve 2 has a sleeve portion 21 which is fitted to an inner peripheral wall of the horizontal spindle 30, and an abutting portion 22 which extends radially from an end of the sleeve portion 21 and abuts against the base wall 111. The sleeve portion 21 has a first key slot 211 which is recessed from an outer periphery thereof and which extends axially such that a key 301 of the horizontal spindle 30 is engageable in the first key slot 211.

Figure 8:
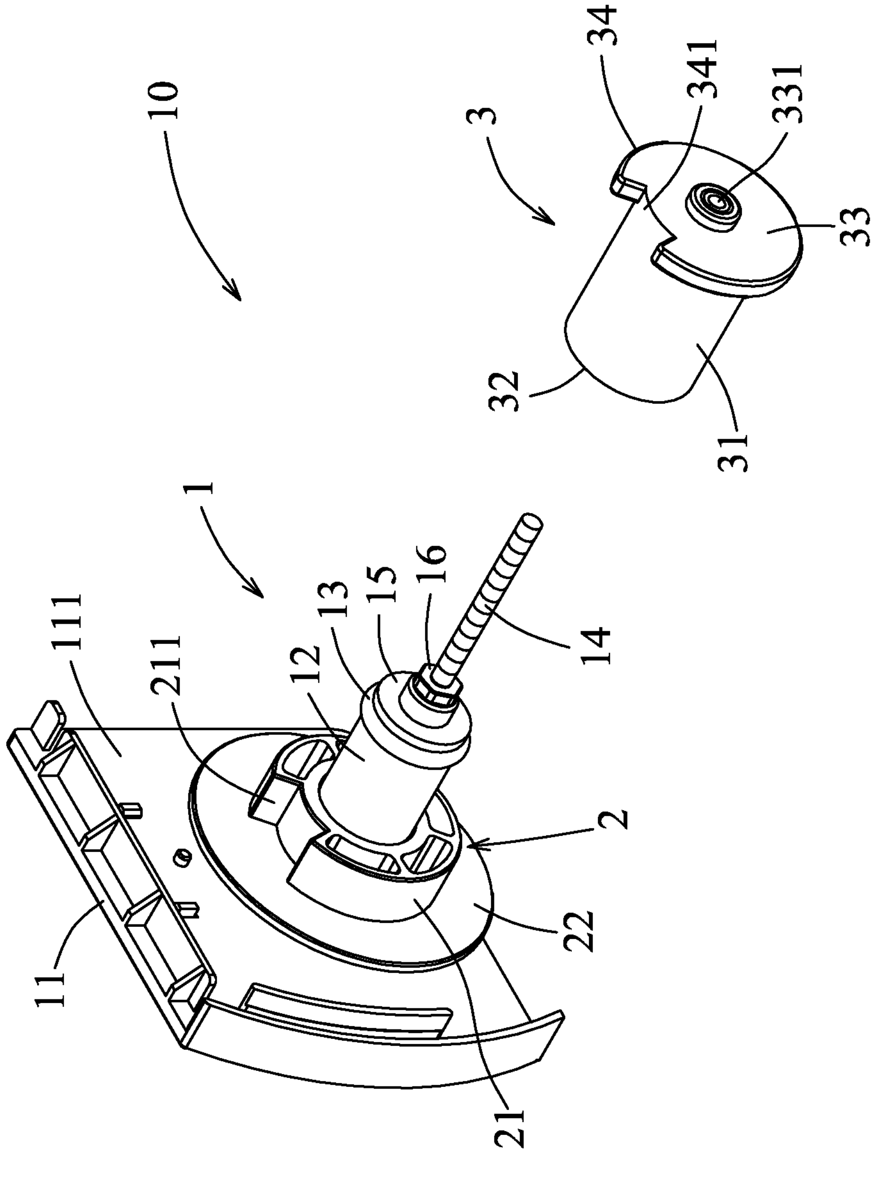
FIG. 8 is a partly exploded perspective view of the embodiment.
Figure 9:
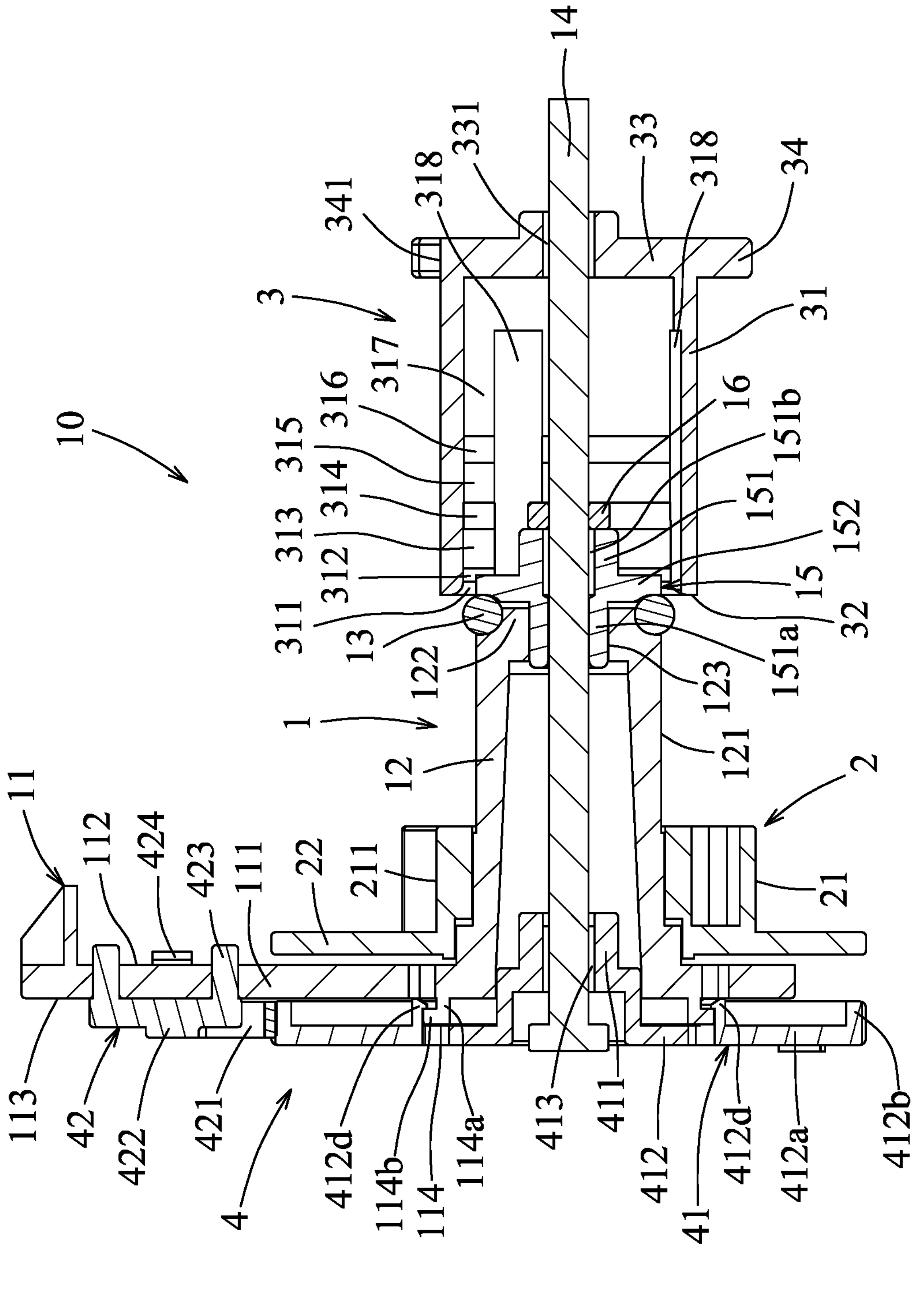
FIG. 9 is a sectional view taken along line IX-IX of FIG. 4.

With reference to FIGS. 8 to 10, the damping cylinder 3 is coaxial with the tubular support axle 12 and the spindle coupling sleeve 2, and is rotatable with the horizontal spindle 30. The damping cylinder 3 has a cylinder body 31 which extends axially to terminate at opened and closed end portions 32, 33. The the opened end portion 32 is disposed proximate to the friction ring 13. The closed end portion 33 has a screw hole 331 which is threadedly engaged with the threaded portion of the screw shaft 14 such that the damping cylinder 3 is axially displaceable along the screw shaft 14 relative to the friction ring 13 during rotation with the horizontal spindle 30. The cylinder body 31 has an inner peripheral wall with various inner diameters such that, during the axial displacement of the damping cylinder 3 relative to the friction ring 13, the inner peripheral wall of the cylinder body 31 is in contact with the friction ring 13 to generate multiple damping forces. In this embodiment, the cylinder body 31 of the damping cylinder 3 has an outer diameter which is smaller than that of the sleeve portion 21 so as not to contact the horizontal spindle 30. The damping cylinder 3 further has a flange 34 which extends radially from the closed end portion 33. The flange 34 has a second key slot 341 which is axially aligned with the first key slot 211 such that the key 301 of the horizontal spindle 30 is engageable in the second key slot 211 to make a synchronous rotation of the spindle coupling sleeve 2 and the damping cylinder 3 with the horizontal spindle 30. Referring to FIG. 9, the cylinder body 31 has a plurality of inner frictional surface sections 311 to 317 which are formed axially and which have different inner diameters and axial lengths. Thus, the inner frictional surface sections 311 to 317 are in frictional contact with the friction ring 13 during the axial displacement of the damping cylinder 3 to generate multiple frictional torques, i.e. the damping forces to the horizontal spindle 30.

During the free lowering of the shade body 40 (see FIG. 2) by its weight, due to the torque of the horizontal spindle 30 and the weight of part of the shade body 40 that is about ⅛ thereof at the initial stage, the damping force applied to the horizontal spindle 30 must be 0 to facilitate lowering of the shade body 40. When ⅜ of the shade body 40 is lowered, a maximum damping force is required to suppress the acceleration from the inertia of the falling shade body 40. Subsequently, the damping force needs to be reduced to a medium force, and then slowly increased until the shade body 40 is fully lowered.

Thus, in this embodiment, when the shade body 40 is entirely reeled on the horizontal spindle 40, the damping cylinder 3 is spaced apart from the friction ring 13. When the user operates the lifting control device 20 to permit the shade body 40 to be freely lowered, the horizontal spindle 30 is rotated without any resistance to drive rotation of the damping cylinder 3. With the threaded engagement of the screw hole 331 with the screw shaft 14, the damping cylinder 3 is displaced axially toward the spindle coupling sleeve 2. During the lowering process of the shade body 40, the inner frictional surface sections 311 to 317 are in frictional contact with the friction ring 13 in that order so as to generate different frictional torques to suppress the rotational speed of the horizontal spindle 30. The inner frictional surface sections 311 to 317 are configured and dimensioned according to the required resistances to ensure a smooth and steady lowering of the shade body 40. When the user operates the lifting control device 20 to roll up the shade body 40, the horizontal spindle 30 is rotated in an opposite rotational direction and drives rotation of the damping cylinder 3 so as to axially displace the damping cylinder 3 away from the friction ring 13. The damping cylinder 3 is returned back its original position when the shade body 40 is completely reeled on the horizontal spindle 30.

Referring to FIG. 9, in this embodiment, the cylinder body 31 of the damping cylinder 3 further has a plurality of oil passageways 318 which are formed in an inner peripheral surface thereof and which extend axially for containing lubricant oil therein so as to properly lubricate the friction ring 13.

With reference to FIGS. 7, 9, 11 and 12, the mounting seat 11 further has an annular retaining wall 114 which extends from the outer wall surface 113 of the base wall 111. The annular retaining wall 114 has a smaller-diameter section (114*a*) which is connected with the base wall 111, and a larger-diameter section (114*b*) which is spaced apart from the base wall 111. The tightness regulating module 4 includes a rotational control member 41 which is rotatably disposed on the outer wall surface 113 of the base wall 111, and a rotation restricting member 42 which is disposed on the base wall 111 and movably and frictionally engaged with the rotational control member 41 to restrict the rotation of the rotational control member 41. Specifically, the rotational control member 41 has an axial connecting portion 411 which is coaxially disposed with the tubular support axle 12, and an operating portion 412 which is connected with and extends radially from the axial connecting portion 411 for being manually operable. The axial connecting portion 411 extends through the base wall 111 and is coaxially inserted into the tubular support axle 12. The axial connecting portion 411 has an axial threaded hole 413 which is threadedly engaged with the screw shaft 14. The operating portion 412 has a circular plate (412*a*), a surrounding wall (412*b*) which extends from and surrounds a periphery of the circular plate (412*a*), and a plurality of retaining protrusions (412*d*) which project from the circular plate (412*a*) and which are angularly spaced apart from each other. The retaining protrusions (412*d*) are slidably engaged with the larger-diameter section (114*b*) to prevent axial movement of the rotational control member 41 relative to the mounting seat 11 and allow rotation of the rotational control member 41 relative to the mounting seat 11. Furthermore, the surrounding wall (412*b*) of the operating portion 412 abuts against the base wall 111 to further prevent the axial movement of the rotational control member 41 relative to the mounting seat 11. The surrounding wall (412*b*) has a plurality of retaining slots (412*c*) which are circumferentially arranged. The rotation restricting member 42 has a biased retaining portion 421 which is flexibly engageable with one of the retaining slots (412*c*).

In this embodiment, specifically, the rotation restricting member 42 is disposed above the rotational control member 41, and has a cross-shaped mounting structure 422, two positioning studs 423 extending axially from two vertical ends of the mounting structure 422, two snap-fit parts 424 extending axially from two horizontal ends of the mounting structure 422. Through the positioning studs 423 and the snap-fit parts 424 retained to through holes 115 formed in the base wall 111, the rotation restricting member 42 is firmly retained to the base wall 111. The biased retaining portion 421 has two biased arms (421*a*) extending from the two horizontal ends of the mounting structure 422 toward each other, and a retaining tip (421*b*) formed at a juncture of the biased arms (421*a*) to be engaged in one of the retaining slots (412*c*).

Figure 12:
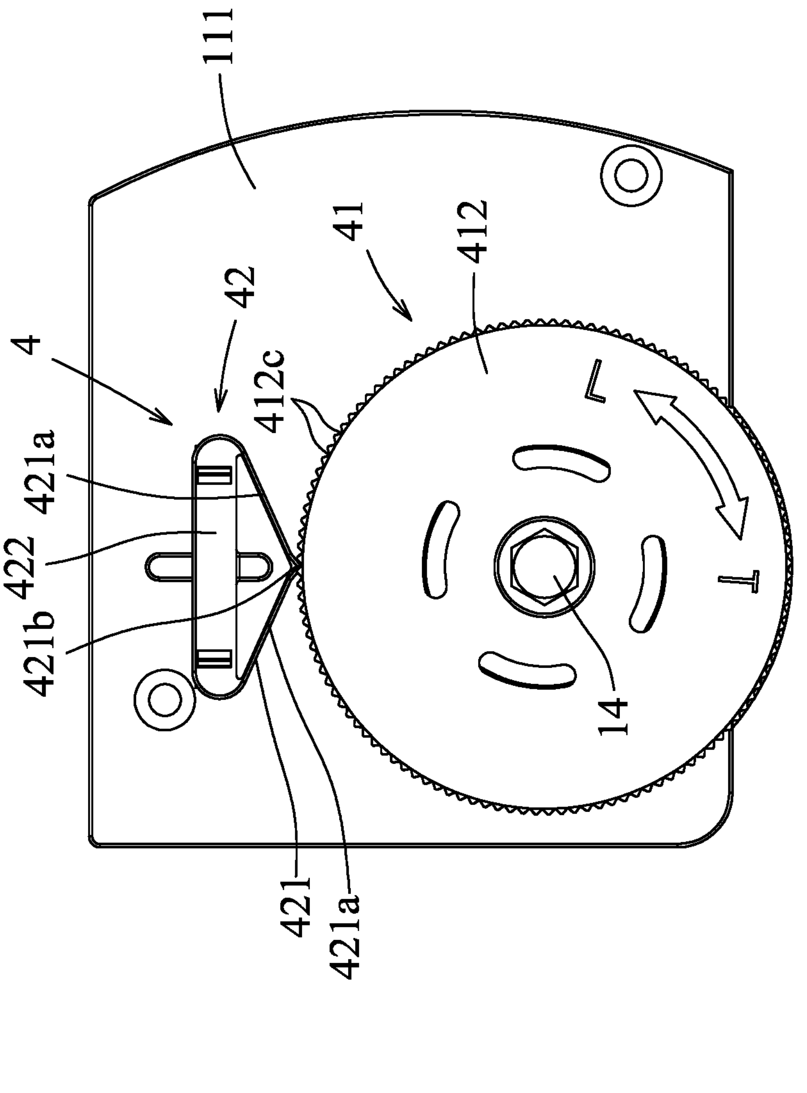
FIG. 12 is a schematic side view of the embodiment.

Rotation of the rotational control member 41 results in axial displacement of the screw shaft 14 to move the tubular tightening member 15 so as to regulate tightness of the friction ring 13. As shown in FIG. 12, for example, when the rotational control member 41 is rotated clockwise, the screw shaft 14 is displaced toward the rotational control member 41 to move the tubular tightening member 15 toward the narrow tubular portion 122 so as to squeeze the friction ring 13 and cause elastic and axial deformation of the friction ring 13. That is, the outer diameter of the friction ring 13 is increased to generate an increased frictional force in contact with the damping cylinder 3. When the rotational control member 41 is rotated counterclockwise, the screw shaft 14 is displaced away from the rotational control member 41 to move the tubular tightening member 15 away from the narrow tubular portion 122. The outer diameter of the friction ring 13 is decreased to generate a decreased frictional force in contact with the damping cylinder 3. Thus, a minor adjustment of the frictional force between the damping cylinder 3 and the friction ring 13 can be performed by rotating the rotational control member 41 so as to be compliant with changes in coefficients of friction of the friction ring 13, which may change according to environmental temperature.

Moreover, with the cylinder body 31 having multiple inner frictional surface sections 311 to 317 which are dimensioned and configured according to the weight and the lowering position of a shade body 40, through the minor adjustment of the frictional force, the damping device 10 can be used with a variety of roller shades with different sizes and weights.

With the rotation restricting member 42 restricting the rotation of the rotational control member 41, an undesired rotation of the rotational control member 41 due to an unexpected external force or a vibration is prevented. Since the biased retaining portion 421 is flexibly engageable with one of the retaining slots (412*c*), the rotational control member 41 is rotatable with a manual force which urges the retaining tip (421*b*) to disengage from one retaining slot (412*c*), pass over and be flexibly engaged in another retaining slot (412*c*). Moreover, the biased retaining portion 421 serves as an indicating member which indicates the position of the rotational control member 41 relative to the retaining tip (421*b*) and the rotational position of the rotational control member 41.

In assembly, the tightness regulating module 4 is securely mounted on the mounting seat 11, and the spindle coupling sleeve 2 is mounted on the support axle 12. The friction ring 13 is then sleeved on the narrow tubular portion 122 of the support axle 12. The centering section (151*a*) of the axial portion 151 is fitted to the anti-rotation hole 123 to connect the tubular tightening member 15 with the support axle 12. Subsequently, the screw shaft 14 is screwed in the tightness regulating module 4 to be threaded engaged with the axial threaded hole 413 and the internally threaded section (151*b*) and a part of the screw shaft 14 then extends through the tubular tightening member 15. The fastener 16 is threadedly engaged with the part of the screw shaft 14 to abut against the tubular tightening member 15. Finally, the damping cylinder 3 is mounted on the screw shaft 14.

In this embodiment, each of the internally threaded section (151*b*), the screw hole 331 and the axial threaded hole 413 is in the form of a screw nut which is made from a metal material and secured on a corresponding one of the tubular tightening member 15, the damping cylinder 3 and the rotational control member 41 which are made from a plastic material so as to enhance the structural strength thereof. Furthermore, by manual operation of the tightness regulating module 4, a minor adjustment of the frictional force between the damping cylinder 3 and the friction ring 13 can be performed. Alternatively, the screw shaft 14 may be rotated by using a tool to adjust the tubular tightening member 15 without the tightness regulating module 4. In various embodiments, the screw shaft 14 and the friction ring 13 may be mounted on the support axle 12, and the tubular tightening member 15 and the tightness regulating module 4 are dispensed therewith.

As illustrated, the mechanical multiple torque damping device 10 has a simple mechanical construction which can generate multiple torques for a horizontal spindle 30, and which is easy to manufacture and assemble, and is compact and light-weighted to be used with any kind of roller shades 100 so as to perform a smooth and steady lowering of a shade body 40.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A mechanical multiple torque damping device connected with an end of a horizontal spindle, comprising:
- a support module including
  - a mounting seat which has a base wall to permit an axis of the horizontal spindle to be normal to said base wall, said base wall having inner and outer wall surfaces opposite to each other,
  - a tubular support axle which is securely connected with said base wall and extends from said inner wall surface to have a terminal end,
  - an elastomer friction ring which is securely sleeved on said terminal end of said support axle, and
  - a screw shaft which coaxially extends through said tubular support axle and which has a threaded portion that extends outwardly of said terminal end of said tubular support axle;
- a spindle coupling sleeve connectable and rotatable with the horizontal spindle, said spindle coupling sleeve being rotatably and coaxially sleeved on said tubular support axle and adjacent to said base wall; and
- a damping cylinder coaxial with said tubular support axle and said spindle coupling sleeve, and rotatable with the horizontal spindle, said damping cylinder having a cylinder body which extends axially to terminate at opened and closed end portions, said opened end portion being disposed proximate to said friction ring, said closed end portion having a screw hole which is threadedly engaged with said threaded portion of said screw shaft such that said damping cylinder is axially displaceable along said screw shaft relative to said friction ring during rotation with the horizontal spindle, said cylinder body having a plurality of inner frictional surface sections which are formed axially and which have different inner diameters such that said inner frictional surface sections are in frictional contact with said friction ring during axial displacement of said damping cylinder to generate multiple frictional torques.

2. The mechanical multiple torque damping device as claimed in claim 1, wherein said spindle coupling sleeve has a sleeve portion which is fitted to the horizontal spindle, said sleeve portion having a first key slot which is recessed from an outer periphery thereof and which extends axially such that a key of the horizontal spindle is engageable in said first key slot, said cylinder body of said damping cylinder having an outer diameter which is smaller than that of said sleeve portion, said damping cylinder further having a flange which extends radially from said closed end portion and which has a second key slot that is axially aligned with said first key slot such that the key of the horizontal spindle is engageable in said second key slot to make a synchronous rotation of said spindle coupling sleeve and said damping cylinder with the horizontal spindle.

3. The mechanical multiple torque damping device as claimed in claim 1, wherein said tubular support axle has a main tubular portion which extends axially from said base wall, and a narrow tubular portion which extends axially from said main tubular portion and which has a gradually decreasing outer diameter to serve as said terminal end, said friction ring being sleeved on said narrow tubular portion, said narrow tubular portion having a non-circular anti-rotation hole formed in a center thereof, said support module further including a tubular tightening member, said tubular tightening member having an axial portion and a radial portion which extends radially from said axial portion, said axial portion having a centering section which is disposed at a side of said radial portion and non-rotatably fitted to said anti-rotation hole, and an internally threaded section which is threadedly engaged with said threaded portion of said screw shaft such that operation of said screw shaft results in axial displacement of said tubular tightening member relative to said tubular support axle, said radial portion cooperating with said narrow tubular portion to tighten said friction ring.

4. The mechanical multiple torque damping device as claimed in claim 3, wherein said support module further includes a fastener which abuts against said axial portion of said tubular tightening member at an end opposite to said centering section.

5. The mechanical multiple torque damping device as claimed in claim 4, further comprising a tightness regulating module, said tightness regulating module including a rotational control member which is rotatably disposed on said outer wall surface of said base wall, said rotational control member having an axial connecting portion which is coaxially disposed with said tubular support axle, and an operating portion which extends radially from said axial connecting portion for being manually operable, said axial connecting portion having an axial threaded hole which is threadedly engaged with said screw shaft such that rotation of said operating portion results in axial displacement of said screw shaft to move said tubular tightening member so as to regulate tightness of said friction ring.

6. The mechanical multiple torque damping device as claimed in claim 5, wherein said tightness regulating module further includes a rotation restricting member which is disposed on said base wall and movably and frictionally engaged with said rotational control member to restrict the rotation of said rotational control member.

7. The mechanical multiple torque damping device as claimed in claim 6, wherein said operating portion of said rotational control member has a circular plate and a surrounding wall which extends from and surrounds a periphery of said circular plate, said surrounding wall having a plurality of retaining slots which are circumferentially arranged, said rotation restricting member having a biased retaining portion which is flexibly engageable with one of said retaining slots.

8. The mechanical multiple torque damping device as claimed in claim 7, wherein said biased retaining portion has two biased arms extending toward each other, and a retaining tip formed at a juncture of said biased arms to be engaged in one of said retaining slots.

9. The mechanical multiple torque damping device as claimed in claim 7, wherein said mounting seat further has an annular retaining wall which extends from said outer wall surface of said base wall, said annular retaining wall having a smaller-diameter section which is connected with said base wall, and a larger-diameter section which is spaced apart from said base wall, said operating portion of said rotational control member further having a plurality of retaining protrusions which project from said circular plate and which are angularly spaced apart from each other, said retaining protrusions being slidably engaged with said larger-diameter section to prevent axial movement of said rotational control member relative to said mounting seat and allow rotation of said rotational control member relative to said mounting seat, said surrounding wall of said operating portion abutting against said base wall to further prevent the axial movement of said rotational control member relative to said mounting seat.

10. The mechanical multiple torque damping device as claimed in claim 5, wherein said axial connecting portion of said rotational control member extends through said base wall and is coaxially inserted into said tubular support axle.

11. The mechanical multiple torque damping device as claimed in claim 1, wherein said cylinder body of said damping cylinder further has a plurality of oil passageways which are formed in an inner peripheral surface thereof and which extend axially for containing lubricant oil therein.

* * * * *